(12) United States Patent
Chater-Lea (10) Patent No.: US 7,783,285 B2
(45) Date of Patent: Aug. 24, 2010

(54) CELLULAR RADIO COMMUNICATION SYSTEMS AND METHODS AND EQUIPMENT FOR USE THEREIN

(75) Inventor: David Chater-Lea, Crowthorne (GB)

(73) Assignee: Motorola, Inc., Schaumburg, IL (US)

( * ) Notice: Subject to any disclaimer, the term of this patent is extended or adjusted under 35 U.S.C. 154(b) by 1094 days.

(21) Appl. No.: 10/476,353

(22) PCT Filed: Mar. 18, 2002

(86) PCT No.: PCT/EP02/03093

§ 371 (c)(1),
(2), (4) Date: Jun. 1, 2004

(87) PCT Pub. No.: WO02/091622

PCT Pub. Date: Nov. 14, 2002

(65) Prior Publication Data

US 2004/0235525 A1    Nov. 25, 2004

(30) Foreign Application Priority Data

May 9, 2001 (GB) .................................. 0111317.4

(51) Int. Cl.
*H04W 24/00* (2009.01)
(52) U.S. Cl. ........................ 455/423; 455/424; 455/421; 455/419; 455/453
(58) Field of Classification Search .................. 455/522, 455/523, 453, 423, 424, 421, 419
See application file for complete search history.

(56) References Cited

U.S. PATENT DOCUMENTS

| | | | | |
|---|---|---|---|---|
| 5,570,343 A | * | 10/1996 | Bishop et al. | ............... 370/216 |
| 5,584,049 A | * | 12/1996 | Weaver et al. | ............ 455/67.11 |
| 6,263,207 B1 | * | 7/2001 | Kito | ........................... 455/453 |
| 6,370,387 B1 | * | 4/2002 | Reemtsma | ................... 455/453 |
| 6,539,226 B1 | * | 3/2003 | Furukawa et al. | ........... 455/442 |

FOREIGN PATENT DOCUMENTS

| | | |
|---|---|---|
| EP | 0893929 A | 1/1999 |
| GB | 2 280 570 A | 2/1995 |
| GB | 0 299 916 A | 10/1996 |
| WO | WO 93 07725 A | 4/1993 |
| WO | WO9307725 * | 4/1993 |

\* cited by examiner

*Primary Examiner* — Charles N Appiah
*Assistant Examiner* — Kwasi Karikari
(74) *Attorney, Agent, or Firm* — Valerie M. Davis (57) ABSTRACT

Disclosed is a method of operation for use in a radio communications system comprising a cellular network of base stations and mobile units linked to the base stations. The method comprises detecting that a base station has become isolated from the system, wherein the isolated base station has lost at least one link to other base stations but is still in radio communication with its mobile units and changing an output power level of said isolated base station relative to an output power level of one or more selected co-channel base stations of neighboring cells of the cellular system, whereby the range of communications provided by said isolated base station is changed to a different finite value relative to that provided by the said co-channel base stations.

22 Claims, 2 Drawing Sheets

CELLULAR RADIO COMMUNICATION SYSTEMS AND METHODS AND EQUIPMENT FOR USE THEREIN

This application claims the benefit of prior filed co-pending international application Serial No. PCT/EP02/03093 filed Mar. 18, 2002, and assigned to Motorola, Inc., which was published by the International Bureau on Nov. 14, 2002 under No. WO 02/091622A1; and Great Britain application Serial No. 0111317.4 filed May 9, 2001.

FIELD OF THE INVENTION

This invention relates to cellular radio communication systems and methods and equipment for use therein. More particularly, the invention relates to systems comprising a cellular network of base stations each serving mobile units in its location and a method for maintaining interconnection between mobile units in the event of accidental isolation of one or more of the base stations from the system.

BACKGROUND OF THE INVENTION

Figure 1:
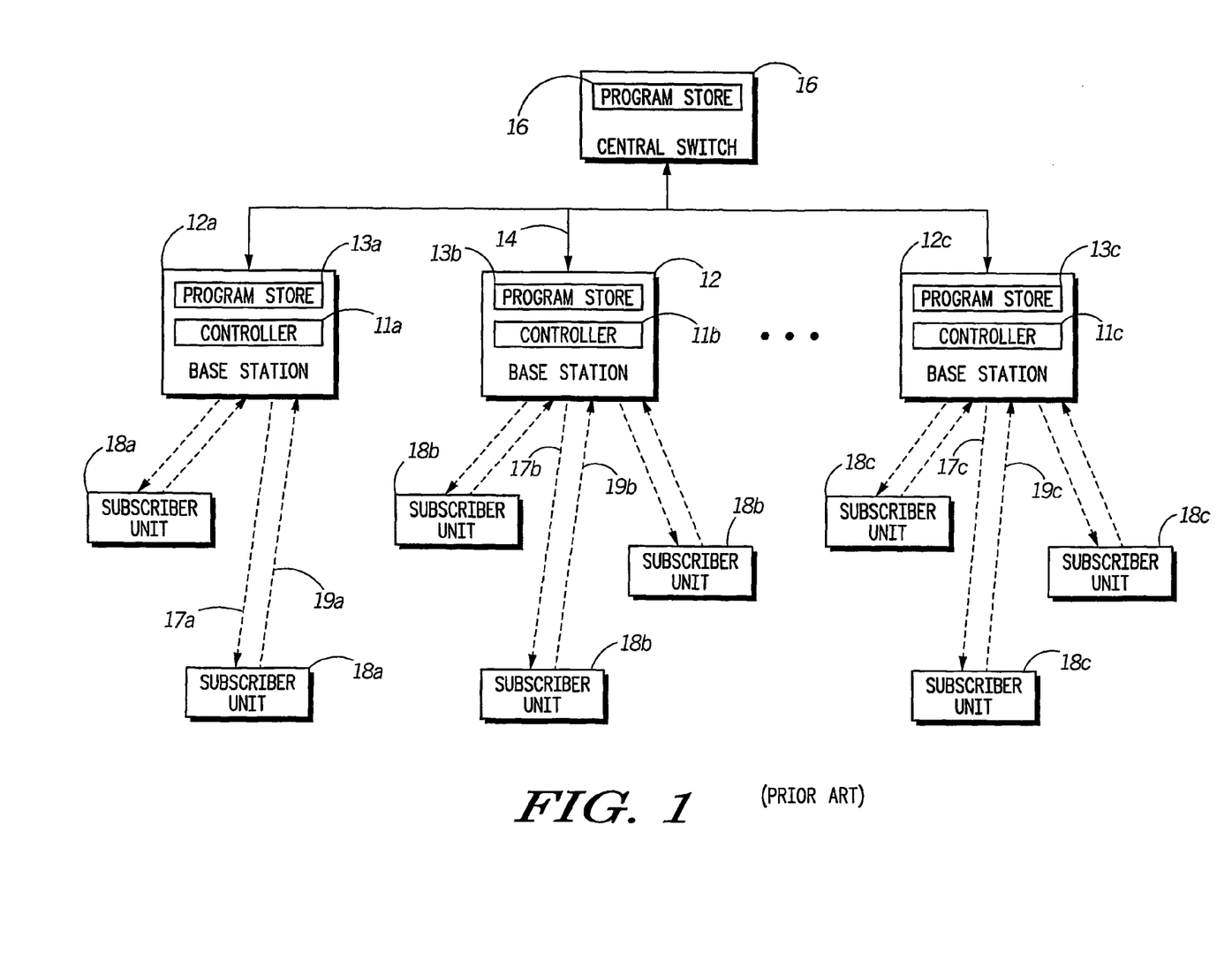
FIG. 1 is a schematic block diagram of a typical known cellular communication system.
Figure 2:
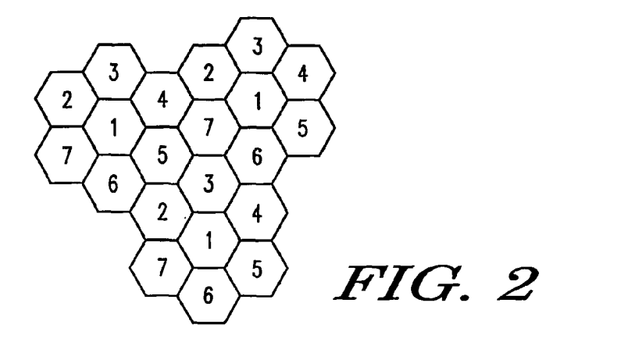
FIG. 2 is a schematic diagram of a known idealised layout of contiguous cells in a cellular communication system, showing channel re-use patterns; the channels are numbered 1 to 7.

A cellular radio communication system, such as illustrated in the block diagram of FIG. 1 of the accompanying drawings, generally consists of an array of base transceiver stations 12 that are deployed over the area of coverage of the system and connected via a network of broadband links 14 to each other and to a central switch or controller 16. Each base station 12 sends radio signals (over a downlink 17) to, and receives radio signals (over an uplink 19) from, mobile transceiver units 18 (also to be referred to as subscriber units or subscribers) located within an area surrounding it, or within a sector thereof, termed a cell. The mobile transceiver units 18 may be mobile telephones, mobile data communication units or portable or vehicle mounted radio units or the like. The size of a cell (e.g. its radius about the base station) is defined as that over which a usable signal is received from the respective base station and largely depends on the power at which its transmitter operates downlink (to be referred to, for brevity, as the "power" of the base station); this subject is discussed further below. The exact siting and programmed power of each base station are planned, according to, inter alia, the topography of the area, so as to provide continuous coverage by the cells, with overlapping regions. Each base station is assigned a set of physical channels, over which it communicates with the mobile subscriber units within its cell. Such a set of channels is usually characterized by a group of unique carrier frequencies, but may also be distinguished by other multiplexing methods known in the art, such as CDMA (code division multiple access). There is a finite number of such channel sets and these are assigned to the various base stations so that, at the very least, no adjacent cells share a channel set and preferably so that cells or base stations sharing a channel set, termed co-channel cells or co-channel base stations, are mutually distant sufficiently to keep mutual interference below some given threshold value. An ideal layout (which may arise in a situation of homogenous topography and requirements) is schematically depicted in FIG. 2, as an illustrative example. Here the base stations and their associated cells are arranged in a regular hexagonal cell grid and they are assigned seven sets of channels. A channel re-use pattern in a network of cells in a system operating as shown in FIG. 1 is thus shown in FIG. 2. The numerals in the cells in FIG. 2 indicate use in each cell of a particular channel, e.g. frequency, in the set of seven channels numbered 1 to 7. In a practical network, the base stations are generally deployed in a much less regular manner and the shapes and sizes of their associated cells will vary. The present invention is equally applicable to any system, having any cell size and shape and any deployment topology.

Generally each mobile unit can receive signals from several proximate base stations. Each received signal is characterized by a carrier-to-noise ratio (C/N) and a carrier-to-interference ratio (C/I), where the interference is mainly from nearby co-channel base stations. Both ratios depend on the current downlink power of the corresponding base station; the C/I, however also depends on the current power of the nearby co-channel base stations. These ratios can be measured by the mobile subscriber unit and compared against each other, as well as with stored threshold values. A mobile unit is generally programmed initially to scan the channels (e.g. the frequencies) and to select that with the highest C/I and/or highest C/N and then to establish communication with the corresponding base station, which thus becomes the so-called active base station. The mobile subscriber unit is then said to be linked to the active base station. When any of the two ratios drops below a certain respective threshold level (owing to changing location or other causes), in some types of systems the power of the base station at the respective channel is raised and if it has reached its maximum programmed value, which in other systems (notably those based on TDMA—time divison multiple access) is always the case, a so-called reselection process is initiated, whereby the mobile unit selects from among other received signals the one with the highest C/I and/or C/N, switches communication to the corresponding channel and thus becomes linked to the corresponding base station, which becomes its active base station. In effect, the mobile subscriber unit thus moves from one cell to another (usually adjacent) cell. If all mobile units have the same threshold values stored, they would generally undergo reselection, upon moving away from the active base station, at about the same distance—which defines the effective range (or just "range") of the base station or the boundary (and hence, size) of the cell. Thus, clearly, the effective boundary of any cell is a function of the stored threshold values, as well as of the power of the active base station and of any interfering co-channel base stations for each channel. For any system, threshold values and (as mentioned above) also the base stations deployment topology and power values are generally chosen so that the areas within the effective boundaries of adjacent cells (i.e. the ranges of their corresponding base stations) overlap substantially, in order to have sufficient margin of safety for contiguous service.

It is to be noted that the total power transmitted by any base station is the sum of the powers of all active channels and is limited by the capacity of the transmitter's power amplifier. In general, the power levels of all channels (or their maximum values, in systems where the levels vary according to reception conditions) in any one base station are set so that the total power is below the amplifier's capacity—to correspond with the designed range of the respective cell. This setting of power levels (whether of individual channels or of the overall power) is usually achieved through appropriate programming and thus can, in principle, be changed—e.g. when various conditions change; such a change is, however, not a common practice and is generally done only through intentional directed programming, as part of a system re-design.

Typically, a mobile unit has a programmable digital controller, which stores various parameters related to the communication process, including, in particular, those related to monitoring and calculating C/N and C/I ratios of received signals, identifying adjacent cells and controlling the reselection process. These parameters can be downloaded from the system over a control channel during system operation.

A communication path between any two mobile units 18 within a cellular system usually consists of the radio link between each of them and its respective base transceiver station 12 and the path through the wide-band network 14 between each of the base stations 12. Each radio link between a base station 12 and a mobile unit 18 consists of the downlink 17 and the uplink 19. If the two mobile units are within the same cell, the link may consist of their radio links only, if the base station is so programmed, in which case they are said to be directly connected. One method for such direct connection, for example, is the use of so-called site trunking protocols. Another method, to be explained in the next following paragraph, is aimed at group calls.

Each base station 12 typically includes a digital controller 11 and a digital program store 13 (for software programs and data), which together serve to control the communication process between the linked mobile units 18 and other base stations and the central switch 16 (and where appropriate with agents external to the system). Similarly, the central switch 16 includes a digital program store 15, to serve in controlling communication with all of the base stations 12 and with the external world beyond the system network.

The present invention is applicable to any type of cellular communication system, but it is particularly suitable for use in the so-called Private Mobile Radio system (PMR) or Trunked Mobile Radio (TMR) system—especially when having provision for group calls. In such a system, which generally serves for dispatch mode of service (i.e. ready communication within a "fleet" of mobile subscriber units, usually belonging to one organization), the users share common channel resources, and are directed to use these resources under the control of a central controlling entity; the latter is usually the central switch of the system, but in cases such as addressed by the present invention it may be a fallback base station. During a group call, a defined group of mobile subscriber units (usually a subset of the fleet) is interconnected so that all their operators can listen simultaneously to any one of them talking. In many cases, mobile subscriber units defined to belong to a group are frequently located within a relatively small geographic area (for example, members of a police unit patrolling a town). Often this area is, to a great extent, congruent with a cell—sometimes by design of the system. A group call between mobile subscriber units linked to the same base station is generally carried out by direct connection (i.e. not through the central switch)—usually by means of a shared channel; this is a semi-duplex mode of communication, whereby all members of the group within the cell use the same channel pair, one member doing the talking over the uplink channel and all others listening over the downlink channel. Communication with group members in other cells is carried out over the usual path, which includes the central switch, where the appropriate connections are made.

For normal operation of the cellular network 14 shown in FIG. 1, each base station 12 is connected either by radio communication and/or by a physical line connection to other terminals, especially other base stations 12. Each base station 12 is thereby connected directly or indirectly to the central switch 16 as indicated in FIG. 1. In such normal use, network control signals to and from the central switch as well as traffic signal (signals representing speech, data etc) are sent via this network of links.

Among the faults that may accidentally occur in an operational system, two give rise to problems which are solved by the present invention. The first one occurs when a base station loses its link to one or more other base stations and becomes partially or totally isolated. In consequence, the base station may also become disconnected from the central controller or switch. In such a case, all mobile units currently served by this base station may continue to be served by this station or, if appropriate, may communicate with other mobile units within range directly. However, indirect connections to mobile units served by other base stations normally connected to the isolated base station via the lost link(s) will be lost.

The second operational fault may occur when all, or a large number of, base stations of the network become isolated from one another or from the network infrastructure, for example owing to a fault in the network or in the central switch. In this case, of course, all inter-cell communications will be lost and, again, only intra-cell or direct communications will be possible.

In many installed PMR or TMR systems, large groups of subscribers, with their respective mobile subscriber units, are often located within relatively small geographic regions (e.g. towns), with most of the communication traffic occurring within any group. Much of this traffic may be in the form of group calls. Such a region is typically covered by a few contiguous cells and each mobile subscriber unit is serviced by the base station providing the best signal. If one of these base stations becomes isolated, a so-called fallback situation is declared and a fallback procedure is initiated. The main objective now becomes to keep as many subscribers as possible interconnected—which, in most cases, means keeping as many groups as possible intra-connected. One of two general situations may be discerned: (a) one or more groups are largely located within the isolated cell or immediately adjacent to it; (b) most subscribers within the isolated cell are not interconnected and do not belong to a common group.

There is thus a clear need for a method and system that will further increase the number of mobile units that remain interconnected in fallback situations caused by individual or massive isolation of base stations from the cellular system.

GB-A-280570A describes a procedure for dealing with the isolation of a cell caused by failure of its base station whereby service to mobile units within the cell is lost, i.e. it is assumed that the output from the affected base station is lost. This procedure involves expanding the range of adjacent cells by increase of their output power. The procedure is intended to provide communication coverage to some of the mobile units which have lost service from the failed base station. By implication, the cells adjacent to the one which has failed are on a different frequency to provide this bordering coverage.

SUMMARY OF THE INVENTION

The present invention is concerned with providing an improved method of operating a cellular communication system. The system maybe a digital cellular radio communication system and may be a system wherein adjacent cells within a given group operate at different frequencies and the frequencies and preferably the frequency pattern from cell to cell used within the group are repeated in other groups of the network. It is an object of the present invention to provide in such a system a method for increasing the number of mobile units remaining in mutual communication in the event that a base station of one of the cells becomes isolated from the system, owing to a failure in its linkage with the network controller or switch, as well as in the event that a large number of base stations become mutually isolated, owing to system failure.

Such an object is realised in accordance with the invention by a method which includes (i) detecting a failure condition relating to the given base station whereby one or more links of the base station to other base stations of the system is or are lost and, in consequence; and (ii) changing the output power level of one or more neighbouring base stations; and is characterised in that in the failure condition the given base station is partially or totally isolated from other base stations but is still in radio communication with its served mobile units and the finite output power level of the given isolated base station and the finite output power level of one or more selected co-channel base stations of neighbouring cells of the cellular system are changed relative to one another, whereby the range of communications provided by the given base station is changed to a different finite value relative to that provided by the said co-channel base station or stations.

Thus, a fallback mode of operation is initiated such that some mobile units served by the isolated base station may remain in mutual communication with the isolated based station.

More particularly, in the event that a single base station becomes isolated from the system, a first form of the method is as follows. This form may be applied as a fallback procedure in the situation where the isolated base station is designated by the system to be favoured, e.g. a concentrated group of mobile units exists or is expected to exist near to that base station and/or that base station provides a relatively wide area coverage compared with neighbouring co-channel stations which are base stations operating on the same frequency as the isolated station. The favoured designation may have been previously set during system design and implementation or it may be detected by the system on the occasion when the isolation event occurs. This form of the method includes increasing the output operational power level of the isolated base station, whilst possibly also decreasing the output operational power level of neighbouring co-channel base stations. This form of the method increases C/I ratio over the coverage area of the isolated base station, thus extending the coverage area of the isolated base station and this facilitates more mobile units remaining linked to this base station or switching over to this base station from co-channel base stations of neighbouring cells.

A second form of the method may be applied as a fallback procedure in the situation where the isolated base station is not designated by the system to be favoured, i.e. the number of mobile units linked to the station is or is expected to be lower than the number linked to neighbouring co-channel stations and/or the area of coverage provided by the station is smaller than that provided by neighbouring co-channel stations. The unfavoured designation may have been previously set during system design and implementation or it may be detected by the system on the occasion when the isolation event occurs. The second form of the method includes decreasing (including where appropriate reducing to zero) the output operational power level of the isolated base station, whilst possibly also increasing the output power level of neighbouring co-channel base stations. This decreases the C/I ratio of the isolated station and shrinks the coverage area of the isolated station facilitating mobile units to switch over, or stay linked, to neighbouring base stations.

A third form of the method of the invention may be applied as a fallback procedure in the situation where many or all of the base stations become isolated, e.g. owing to a system failure. This form includes having certain base stations designated as key stations, according to their expected higher degree of common coverage of mobile units, and having other base stations, having a lower expected degree of coverage, designated as non-key stations. This form of the method further includes, in the event of isolation of a large number of the base stations, e.g. due to a network failure, increasing or at least maintaining the output operational power level of all key stations, whilst possibly also decreasing or switching off the power level of other base stations, designated as non-key stations. The range of the key stations is thereby extended and this facilitates more mobile units being allowed to link, or remain linked, to key base stations.

The method of the present invention may include use of an automatic procedure programmed into the control system of the base stations and/or the network controller or switch during system setup, to effect the specified changes which are required following sensing of an isolation event. Such procedures are described further below.

The method according to the invention may include, in the case of each base station which has changed output power level as a result of the isolation event, sensing that the isolation event has finished and returning the base station to the output power level existing during normal operation before the isolation event.

The method according to the invention may be enhanced when it is combined with the use of one or more known algorithms which may be programmed into mobile units to determine which base station(s) the units should select to communicate with. The mobile units may be programmed such that on sensing of an isolation event the communication of the mobile unit is steered toward one or more base stations then favoured by the mobile unit and/or as directed by the system.

The method of the invention is further defined in the appended claims.

According to the present invention in another aspect there is provided a base station for use in a cellular communication system using the operational method of the invention, the base station being operable, upon becoming isolated from the system or upon a nearby co-channel base station becoming isolated from the system, to change its own output operating power level, in accordance with the said method, e.g. in one of the forms defined above.

The change in power level following an isolation event may increase or decrease the output operational power level of radio communication transmissions from the base station as described earlier. The power level that is changed may be the programmed power level in the case of a base station normally having a fixed output power level or it may be the maximum output power level in the case of a base station that normally can transmit at different power levels.

The need for a base station which becomes isolated to make an output power level change can be sensed internally by the base station by lack of signals from the network system controller or switch. In such a condition, an internal controller within the operating control system of the base station may be activated to generate automatically a control signal which causes the operating power level to be changed, i.e. either to be increased or decreased as appropriate. Data may be stored in a memory store within the operating control system of the base station defining what the output power level to be provided by the base station is to be in the event of the base station becoming isolated as indicated by a signal provided by the internal controller. The power level may be set accordingly by the output power controlling part of the operating system control of the base station.

The need for a base station which remains connected to the network to make a power change because of isolation of a neighbouring co-channel base station can be provided by a control signal from the network system controller or switch. Such a condition may be sensed by the system controller or switch by lack of signals from the isolated base station. The control signal sent to the base station by the network controller or switch can be a simple signal instructing the base station to change power level, in which case the base station may be pre-programmed to recognise and understand the control signal. The base station may thereby automatically change to a certain pre-defined output power level, which may where appropriate be a zero output power level. The control signal could alternatively be one of a number of different possible signals each giving different instructions. For example, the control signal may indicate that the base station should increase or decrease its output power level or indicate the power level to which the base station should change. In this case, the base station will be pre-programmed to recognise the received control signal and to act accordingly, the required change being effected by the output power level control within the base station internal system control.

According to the present invention in another aspect there is provided a cellular communication system for maintaining radio communication between mobile communication units via a cellular network of base stations, wherein the system is operable according to the method of the invention and wherein each of said base stations is operable to change its own operating power upon that station or a nearby co-channel station becoming isolated from the system in accordance with the said method.

Embodiments of the present invention will now be described by way of example with reference to the accompanying drawings, in which:

DETAILED DESCRIPTION OF EMBODIMENTS OF THE INVENTION

The manner in which the invention satisfies the stated needs described earlier will now be explained with respect to each of the problem situations described in the Background section of this specification. The following description is exemplary in terms of a Private Mobile Radio (PMR) system, with base stations having direct connection capability. The invention may however be applicable also to other types of cellular systems, with modifications which will be readily apparent to persons skilled in the art. The method of the invention calls for measures to be taken on two different occasions—(1) upon setting up and programming (or re-programming) a particular cellular system and (2) when a fault is detected. The first mentioned occasion may even extend back to the planning phase of the system, whereby some of its characteristics (notably cell boundaries and channel allocation) may be determined iteratively with the needs of fallback procedures, especially when operating according to the present invention.

During system setup each cell is classified as to its relative size, its role in the cellular scheme (e.g. dominant, fill-in or something between them) and the degree of congruence between the cell coverage and the likely distribution of subscribers belonging to any one group. In anticipation of a system-wide station isolation fallback, certain base stations (notably those with wide coverage and high congruence with groups) are designated as "key stations". Other base stations, having less group coverage, are designated as "non-key stations"; these may include all other base stations in the system. Each base station is then programmed, according to its classification and designation, to function in fallback situations as set forth below. The programming preferably consists of storing in the respective base station, as well as in the central switch, certain commands and parameters, to be activated or passed on during a fallback procedure.

Figure 3:
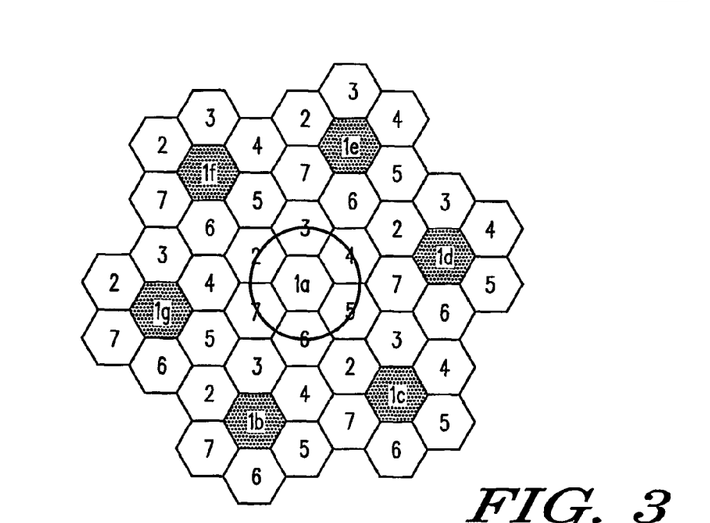
FIG. 3 is a diagram similar to that of FIG. 2, schematically illustrating a layout of contiguous cells as present in an embodiment of the present invention.

The event of a base station becoming isolated from the network is sensed by the affected station, as well as by the rest of the system, and this initiates corresponding fallback procedures. The present invention specifies that such a procedure include changing the operating power of the isolated base station and/or of nearby (usually surrounding) co-channel base stations, according to how they were programmed. In a practical system there may be many considerations brought to bear on the program parameters loaded into any base station, as will be discussed further below. Typically, the following will be effected: If the isolated station has a large coverage area, which, moreover, includes the expected mobile subscriber unit locations of a considerable proportion of one group, its allowed power level is preferably increased, possibly up to the maximum attainable level. At the same time, the power level of each nearby co-channel base station is preferably decreased. The effect of each of these two changes, and of course also of their combination, is to increase the C/I ratio within the cell of the isolated base station, as well as to widen its boundary (for any acceptable threshold of C/I). The resultant fallback situation is illustrated in FIG. 3 in the case of an ideal, hexagonal, layout of cells (similar to that depicted in FIG. 2). Here the isolated cell is outlined by a heavy line and the widened boundary schematically denoted by a heavy circle; the nearby co-channel base stations, whose power may be reduced, are marked by dotted fill-patterns. Thus more mobile subscriber units within the isolated cell are induced to remain linked to the respective base station, while some mobile subscriber units that were formerly linked to an adjacent base station (on another channel) are induced to re-select (switch over to) the isolated base station. The effect is that more subscribers, especially those belonging to the group that normally populates the respective cell, are able to communicate among themselves.

Biasing the threshold values in mobile units through specialized procedures, such as "Home Cell" and "Preferred Locations" to favour certain cells is known. According to the former procedure, all members of a group are assigned a particular base station as their "Home Cell" and the reselection parameters are set so as to favour that base station when in its vicinity. According to the latter procedure, the mobile units of all members of a group are given a list of preferred base stations and, optionally, a list of unfavorable base stations. These known procedures may be used in embodiments of the present invention.

Thus, if the mobile subscriber units of the group that normally populates the affected cell are also set to refer to the isolated base station as their Home Location, which means that their reselection parameters are biased toward that base station, the positive change in the C/I, caused by the power changes according to the present invention, enhances the Home Location effect. By such means, the number of mobile subscriber units potentially interconnected through the isolated base station is even greater. This is similarly true for the case that the isolated base station is in the list of preferred stations. Alternatively and optionally, the isolated and adjacent co-channel base stations can be programmed to send to the mobile subscriber units appropriately modified threshold values for reselection—again achieving the same enhancement effect.

If the isolated station has mainly a fill-in role, its allowed power level is preferably decreased. At the same time, the power level of each nearby co-channel base station is preferably increased The effect of each of these two changes, and of course also of their combination, is to decrease the C/I ratio within the cell of the isolated base station, as well as to shrink its boundary (for any acceptable threshold of C/I). Thus some mobile subscriber units within the respective cell are induced to reselect an adjacent base station (co-channel or on another channel), while mobile subscriber units that are linked to an adjacent base station are induced to remain so over a greater distance therefrom. The effect is that more subscribers, especially those belonging to a group that normally populates any of the adjacent base stations, are able to communicate among themselves. In addition, also more of the other subscribers within the affected cell can now communicate with the rest of the system.

It is to be noted that this beneficial effect will be enhanced if the affected group of mobile subscriber units also has one of the adjacent stations on its preferred list, or the isolated station on its least-preferred list. Alternatively and optionally, the isolated and adjacent base stations can be programmed to send to the mobile subscriber units appropriately modified threshold values for reselection—again achieving the same enhancement effect.

It will be appreciated that all that was described above for a single isolated base station is also applicable for the fallback situation of several base stations having become isolated simultaneously. Clearly, some modifications will be necessary if any two of these stations are in mutual proximity.

It is to be noted that the scheme described above has many parameters, which depend on system characteristics that are unique to any one deployed system and may, moreover, change as the system changes. The system characteristics include base station locations, their maximum power levels and the topography (all of which determine cell boundaries and overlaps); they also include channel re-use pattern (such as depicted in FIG. 2 in an ideal case), definitions of subscriber groups and data about the most likely location regions of their members. The latter is referred to as the expected locations of the subscribers or of the groups.

Fallback parameters, which are pre-loaded into each base station, as well as into the central switch, preferably include:
  the command (or lack thereof) to change power in the event of the base station becoming isolated and the amount and sense (i.e. an increase or a decrease) of such change—all stored in each base station;
  the command (or lack thereof) to change power of a base station in the event of a nearby co-channel base station becoming isolated, and the amount and sense of such change—stored in the central switch or in each base station;
  the command to increase power in any key station in the event of massive system related isolation, and the amount of such increase—stored in the respective key station;
  the command (or lack thereof) to decrease power in any non-key station in the event of massive system related isolation, and the amount of such decrease—stored in the respective non-key station.

It will be appreciated that such parameters may also take other forms, such that the combination of a command and an amount is represented by a signed change value, where 0 means no change.

As discussed above, these fallback parameters may be determined for each base station, based, inter alia, on its classification with respect to coverage areas and to subscriber groups. However, all system characteristics are brought to bear in optimally determining the parameters, especially the amounts of change. There are, in general, no firm rules for this optimal determination process, since it depends on the characteristics in a complex way and each deployed system is unique. Additional considerations that may be brought to bear are the relative importance of the various groups of subscribers. It will, however, be appreciated that the principles of the present invention can be advantageously applied in any case, whereby in a fallback situation the number of linkable subscribers is appreciably increased, even if not achieving the optimal service for all subscribers (e.g. maximum number of linkages). It is to be noted in this context that the term "optimal" has a variable meaning and depends on various preferences and operational considerations, some of which have statistical bases.

We turn now to the other major fault situation wherein all base stations become simultaneously isolated from the system. As discussed in the Background section, the main achievable goal for a fallback procedure is to maximize the number of inter-linkable subscribers that belong to any group, the assumption being that each group is concentrated in the vicinity of one base station. It has been described above how, according to the present invention, certain base stations are designated as key stations and certain others as non-key stations. Further according to the present invention, some or all key stations are so programmed that upon the occurrence of such a fault situation, the respective power of each is increased. Also according to the present invention, some or all non-key stations are so programmed that upon the occurrence of such a fault situation, the respective power of each is decreased. Generally there will be such key stations and non-key stations associated with each set of reusable channels. Preferably key stations and non-key stations associated with any one set of channels are chosen so as to be mutually interleaved; thus usually some co-channel non-key stations will be nearer to any key station than are other co-channel key stations.

As a result, in an overall fault situation, the C/I ratio within the cell of each key station increases, while its boundary (for any acceptable threshold of C/I) widens. Thus more mobile subscriber units within each corresponding cell are induced to remain linked to the respective key station, while some mobile subscriber units that were formerly linked to adjacent base stations (on other channels), which generally are non-key stations, are induced to switch over to that key station. The effect is that more subscribers belonging to the group that normally populates a cell that corresponds to a key station remain connected and are able to communicate among themselves.

Figure 4:
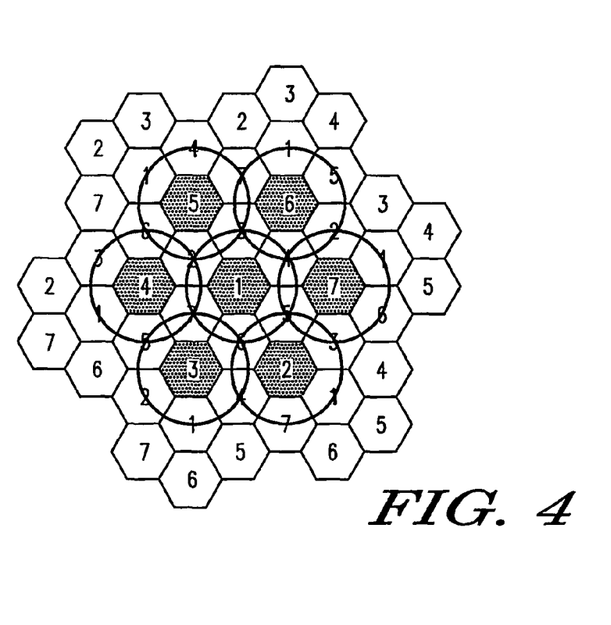
FIG. 4 is a diagram similar to that of FIG. 2, schematically illustrating a layout of contiguous cells as present in another embodiment of the present invention.

The resultant fallback situation is illustrated in FIG. 4 in the case of an ideal, hexagonal, layout of cells (similar to that depicted in FIG. 2). Here cells that contain key base stations are marked by dotted fill-patterns and their increased coverage areas are schematically denoted by heavy circles. The layout of key stations in the diagram of FIG. 4 also illustrates another preferred feature of the invention, namely that key stations are preferably chosen so that their normal cell coverage areas are non-contiguous. The latter feature minimizes the effect of mutually proximate key stations counteracting each other in affecting the reselection process of mobile subscriber units within their overlapping coverage areas. As shown in FIG. 4, the key stations are the station of a cell operating on channel 1 deemed to be inside the set of key cells and the ring of nearest but not contiguous cells having stations operating respectively on channels 2 to 7 respectively.

Clearly, in any practical system the station layout pattern and the cell boundaries are generally irregular and more complex. Hence, the designation of key stations and the parameters, such as size of power change, loaded into each base station for this fallback procedure, are determined, again, by complex considerations that are based on the characteristics of the particular system and its subscribers. As in the single-base station isolation type of fault, discussed above, such considerations may be aimed at optimizing, in some sense, the possible intra-group communication; however the principles of the method disclosed herein can be applied advantageously in most systems even without seeking optimal results.

The known procedures of "Home Cell" and "Preferred Sites" designation and of transmitting new C/I threshold parameters, all mentioned above, can optionally be used to enhance the effect of the method of this invention also in the situation of overall base station isolation. For example, Home Cell may be identified with key stations and, as a result, corresponding mobile subscriber units would be even further biased toward them in a fallback situation. Similar effects can be achieved by Preferred Sites being identified with key stations and by downloading appropriate reselection parameters, as explained above with respect the single-base station isolation fallback situation.

It will be understood that, while the description above is in terms of methods, the present invention also includes a cellular communication system programmed to carry out the methods, as well as a base station for use in a cellular communication system, being operative, upon becoming isolated from the system or upon a nearby co-channel base station having become isolated from the system, to change its own operating power, without necessarily switching the power off.

It will likewise be understood that many more configurations of the system and method disclosed above, and modifications thereof, are possible—all coming within the scope of the invention, as defined in the claims.

The invention claimed is:

1. A method of operation for use in a radio communications system comprising a cellular network of base stations and mobile units linked to such base stations, the method comprising the following steps, with respect to any base station operable to provide direct radio communication with mobile units linked thereto:
   (i) detecting that a base station has become isolated from the system, wherein said isolated base station has lost at least one link to other base stations but is still in radio communication with its mobile units and,
   (ii) changing an output power level of said isolated base station relative to an output power level of one or more selected co-channel base stations of neighboring cells of the cellular system, whereby the range of communications provided by said isolated base station is changed to a different finite value relative to that provided by the said co-channel base stations.

2. A method according to claim 1, wherein the system in which the method is applied comprises a system in which base stations of adjacent cells within groups within the network operate at different frequencies and operational frequencies are repeated in different groups of cells within the network and said co-channel base stations are in different groups from that including said isolated base station.

3. A method according to claim 1 which comprises changing the output power level of selected co-channel base stations in a set of groups of cells nearest to the group which includes said isolated base station.

4. A method according to claim 3, wherein the selected co-channel base stations are base stations located in a ring around the isolated base station and operating on the same frequency as the isolated base station.

5. A method according to claim 1, wherein the actual or expected communication coverage to mobile units provided by the isolated base station is such that the isolated base station is designated as favored compared to said selected co-channel base stations and the output power level of the isolated base station is increased in step (ii) thereby to increase the range of communications provided by the isolated base station.

6. A method according to claim 1, wherein the operating power level of said selected co-channel base stations is reduced in step (ii).

7. A method according to claim 5, wherein a base station selection program is stored within mobile units in a group within communication coverage of at least one of the isolated base station and said selected co-channel base stations wherein the program is to steer communication of the mobile units to favour the isolated base station after isolation has been detected.

8. A method according to claim 1, wherein the actual or expected communication coverage to mobile units provided by the isolated base station is such that the isolated base station is designated as not favored compared to said selected co-channel base stations and the output power level of the isolated base station is reduced in step (ii).

9. A method according to claim 1, wherein the output power level of said selected co-channel base stations is increased in step (ii).

10. A method according to claim 9, wherein a base station selection program is stored within mobile units in a group within communication coverage of at least one of the isolated base station and said selected co-channel base stations wherein the program is to steer communication of the mobile units away from the isolated station and toward one or more of said selected co-channel base stations after isolation has been detected.

11. A method according to claim 1, wherein a base station selection program is stored within mobile units in a group within communication coverage of at least one of the isolated base station and said selected co-channel base stations wherein the program is to steer communication of the mobile units after isolation has been detected, wherein the selection program is selected from Home Location program and a Preference List program.

12. A method according to claim 1, wherein certain base stations of the system are designated as key stations and certain other base stations of the system are designated as non-key stations, and wherein the method comprises changing relative to one another the operating power level of said isolated base station and the output power level of one or more selected neighboring base stations of the cellular system according to whether the isolated base station is a key or non-key station.

13. A method according to claim 12, which includes decreasing or switching off the output power of one or more non-key base stations that have become isolated from the system.

14. A method according to claim 12, which comprises maintaining or increasing the output power level of one or more key base stations that have become isolated from the system.

15. A method according to claim 12, wherein a base station selection program is stored within mobile units in a group within communication coverage of at least one or more isolated key base stations and said selected co-channel base stations wherein the program is to steer communication of the mobile units after isolation has been detected.

16. A method according to claim 15, wherein said mobile units are programmed to have a Home Location program specifying a home location that corresponds to one of said key stations.

17. A method according to claim 14 and wherein said mobile units are programmed to have a Preference List which includes therein one or more of said key stations.

18. A method according to claim 12, wherein said designation of key and non-key base stations is such that for each key station there is at least one co-channel non-key station located nearer thereto than any other co-channel key station.

19. A method according to claim 12, wherein every base station of the cellular network of the system is pre-designated as either a key station or a non-key station.

20. A method according to claim 1, wherein the output power level of a plurality of selected neighboring base stations is changed relative to the output power level of other selected neighboring base stations.

21. A method according to claim 20 and wherein the output power level of a set of selected base stations operating in different channels is maintained or increased and the operating power level of other neighboring base stations operating in the same channel as any of the selected set is reduced or switched off.

22. A base station for use in a cellular communication system, the base station being operable, upon detecting that it has become isolated from the system or that a nearby co-channel base station has become isolated from the system, to change its own operating power level relative to the output power level of at least one other base station.

* * * * *

UNITED STATES PATENT AND TRADEMARK OFFICE
CERTIFICATE OF CORRECTION

| | | |
|---|---|---|
| PATENT NO. | : 7,783,285 B2 | Page 1 of 1 |
| APPLICATION NO. | : 10/476353 | |
| DATED | : August 24, 2010 | |
| INVENTOR(S) | : Chater-Lea | |

It is certified that error appears in the above-identified patent and that said Letters Patent is hereby corrected as shown below:

1. On the Title page, Item (56), under "FOREIGN PATENT DOCUMENTS", Line 3, delete "0 299 916 A" and insert -- 2 299 916 A --, therefor.

2. In Column 3, Line 40, delete "talling." and insert -- talking. --, therefor.

3. In Column 9, Line 11, delete "increased" and insert -- increased. --, therefor.

4. In Column 12, Line 59, In Claim 12, delete "said" and insert -- the --, therefor.

5. In Column 12, Line 60, In Claim 12, delete "one or more" and insert -- at least one --, therefor.

6. In Column 12, Line 64, In Claim 13, delete "includes" and insert -- comprises --, therefor.

7. In Column 12, Lines 65-66, In Claim 13, delete "one or more non-key base stations that have" and insert -- at least one non-key base station that has --, therefor.

8. In Column 13, Lines 2-3, In Claim 14, delete "one or more key base stations that have" and insert -- at least one key base station that has --, therefor.

9. In Column 13, Line 11, In Claim 16, delete "said" and insert -- the --, therefor.

10. In Column 13, Line 13, In Claim 16, delete "said" and insert -- the --, therefor.

11. In Column 13, Line 15, In Claim 17, delete "said" and Insert -- the --, therefor.

12. In Column 13, Line 17, In Claim 17, delete "Includes therein one or more of said key stations." and insert -- comprises therein one or more of the key stations. --, therefor.

13. In Column 13, Line 18, In Claim 18, delete "said" and Insert -- the --, therefor.

Signed and Sealed this
Twelfth Day of June, 2012

David J. Kappos
*Director of the United States Patent and Trademark Office*